United States Patent [19]

Rabatin

[11] 4,068,129
[45] Jan. 10, 1978

[54] BISMUTH ACTIVATED RARE EARTH OXYBROMIDE PHOSPHORS AND X-RAY IMAGE CONVERTERS UTILIZING SAID PHOSPHORS

[75] Inventor: Jacob G. Rabatin, Chardon, Ohio

[73] Assignee: General Electric Company, Schenectady, N.Y.

[21] Appl. No.: 749,930

[22] Filed: Dec. 13, 1976

[51] Int. Cl.$^2$ .................................................. G01J 1/58
[52] U.S. Cl. .............................. 250/483; 252/301.4 H
[58] Field of Search ................ 252/301.4 H; 250/283, 250/286

[56] References Cited

U.S. PATENT DOCUMENTS

Re. 28,592  10/1975  Rabatin et al. ................ 252/301.4 H

*Primary Examiner*—Harold A. Dixon
*Attorney, Agent, or Firm*—John F. McDevitt; Lawrence R. Kempton; Frank L. Neuhauser

[57] ABSTRACT

Oxybromides of lanthanum and gadolinium activated with bismuth are found to be superior in their conversion efficiency of X-rays to visible light when compared with conventional X-ray phosphors. The incorporation of the ytterbium ion in these phosphor materials produces reduced afterglow when used in X-ray image converter devices such as X-ray image intensifier tubes, fluoroscopic screens, and radiographic screens.

7 Claims, No Drawings

BISMUTH ACTIVATED RARE EARTH OXYBROMIDE PHOSPHORS AND X-RAY IMAGE CONVERTERS UTILIZING SAID PHOSPHORS

CROSS REFERENCE TO RELATED PATENTS

Terbium-activated rare earth oxyhalide phosphors containing ytterbium for reduced afterglow are described and claimed in U.S. Pat. Re 28,592 which issued May 23, 1975 and is assigned to the assignee of the present invention. Similarly, X-ray image converters utilizing lanthanum and gadolinium oxyhalide luminous materials activated with thulium are described and claimed in U.S. Pat. No. 3,795,814 which issued Mar. 5, 1974, and is assigned to the present assignee.

BACKGROUND OF THE PRESENT INVENTION

The present invention relates to rare earth oxybromide phosphors activated with bismuth for conversion of X-rays to visible light and to X-ray image converter devices utilizing such phosphor materials. The present invention further relates to these phosphor materials having reduced afterglow or phosphorescence from incorporation of activator amounts of ytterbium ion in the lattice of the host phosphor.

Rare earth oxyhalide phosphors activated with terbium or thulium ion are more efficient luminescent materials for converting X-radiation to visible light than conventional phosphors now in use. For example, a LaOBr:Tb has about a 50% greater absorption of incident X-rays and about three to four times greater blue emission than conventionally used $CaWO_4$ phosphor. The various X-ray image converter devices in which said luminescent material is used are described in U.S. Pat. No. 3,617,743 while U.S. Pat. Nos. 3,591,516 and 3,607,770 disclose various processes which can be used to prepare the luminescent material. On the other hand, current radiographic screens employ photographic film which tends to fog when this phosphor is used by reason of an afterglow or long persistent phosphorescence of appreciable intensity. With the use of such long afterglow phosphors, any movement of the film relative to the phosphor screen immediately after exposure will result in blurred images. Addition of ytterbium ion to this phosphor material virtually eliminates the problem of blurred images as described in the aforementioned U.S. Pat. Re 28,592. A different blue emission phosphor which is not subject to the afterglow problem results from activating the same phosphor host material with thulium as disclosed in the further above mentioned U.S. Pat. No. 3,795,814 patent. Said improved phosphor material has significantly reduced afterglow without an appreciable loss in phosphor efficiency.

While the above mentioned rare earth oxyhalide phosphors provide improved performance compared with the conventional $CaWO_4$ phosphor, new phosphors having different characteristics are constantly being sought. It is also not possible to predict whether new phosphors will produce light efficiently since the light output depends upon complex optical and energy interactions. The ability of the host crystal to absorb the X-radiation and convert it into light which can be transmitted back out through the host material is thereby not subject to prediction as a general rule.

SUMMARY OF THE INVENTION

The applicant has found, surprisingly, that certain oxyhalides of lanthanum and/or gadolinium activated with bismuth provide efficient conversion of X-radiation to blue-light emission. Accordingly, it is an object of the present invention to provide rare earth oxyhalide phosphor materials activated with bismuth which generate blue emission efficiently in this manner and which further can be made relatively insensitive to afterglow emission. Specifically, the present X-ray image converter devices employ well-formed crystals of a phosphor material having the general formula $LnOBr:Bi^{3+}$ wherein Ln is one or more of La and Gd with Bi being present as an activator at a concentration level in the approximate range 0.0005 - 0.15 mole per mole of phosphor. The present phosphor can further contain some chloride ion in partial substitution for bromide ion in the host material and can still further contain ytterbium ion from a small but effective amount sufficient to reduce afterglow up to approximately 0.01 mole per mole of phosphor.

Satisfactory phosphors of the present invention can be made by either of at least two processes as disclosed in the above mentioned U.S. Pat. Nos. 3,591,516 and 3,607,770. For either process, it is desirable to start with rare earth oxides co-precipitated with the activator ion which can be bismuth oxide. As will be described hereafter in greater detail, the oxide mixture can thereafter be blended with ammonium bromide and the blended mixture then fired to form the activated phosphor composition which can then be recrystallized with an alkali metal bromide to form the well-crystallized luminescent material of the invention.

DESCRIPTION OF THE PREFERRED EMBODIMENTS

A preferred rare earth oxybromide phosphor of reduced afterglow in accordance with the present invention has a general formula:

$$Ln_{1-x-y}OBr: Bi_xYb_y$$

wherein
 Ln is one or more of La and Gd,
 x is from 0.0005 to 0.15 mole per mole of LaOBr, and
 y is from a small but effective amount to reduce afterglow up to approximately 0.01 mole per mole of LaOBr.

The above preferred phosphor composition can be employed in various X-ray image converter devices of the present invention such as rediographic intensifier screens and fluoroscopic screens as well as X-ray image intensifier tubes. The latter device comprises an X-ray-to-visible light converter screen made with said phosphor composition, a spectrally matched photo-emissive surface capable of converting the light image into an electron image, and a suitable electron-optic system capable of focusing and minifying said electron image onto a second high-resolution phosphor screen also known as an exit screen which is further described in the aforementioned U.S. Pat. No. 3,617,743. A radiographic screen also described in said aforementioned patent is prepared by dispersing one of the phosphors of the invention in a suitable resin binder and then casting the screen on a supporting base member according to conventional techniques known in the art. Such radiographic screens are employed in combination with a photographic film to provide a permanent record of the converted X-ray image.

Preferred phosphor compositions of the present invention are reported in Table I on the following page.

Said phosphor compositions are prepared by the oxalate precipitation method wherein lanthanum oxide, bismuth oxide and ytterbium oxide are dissolved in the mixture of concentrated nitric acid and water. This mixture is then coprecipitated with approximately 10% oxalic acid to form the oxalates of lanthanum, bismuth and ytterbium. The oxalates are then fired to effect the chemical conversion of the oxalates to the mixed oxides of lanthanum, bismuth and ytterbium at approximately 1,000° C for 2 hours in open boats. The mixed oxides of lanthanum, bismuth and ytterbium are blended thoroughly with ammonium bromide and fired for approximately 2 hours at about 425° C in covered boats to chemically form the bismuth-activated lanthanum oxybromide containing ytterbium. This phosphor is recrystallized by thoroughly blending it with potassium bromide and refiring at about 1,000° C for approximately 2 hours in covered boats to form recrystallized larger particle-size bismuth-activated lanthanum oxybromide containing ytterbium. The molten potassium bromide serves as a crystal-growing medium in which to produce well-crystallized phosphor material which is then washed to remove the flux residue. The recrystallized phosphor can be dried in an oven for about 2 hours at 80° C and then sifted through 325 mesh. The effect of ytterbium incorporation to reduce afterglow in the phosphor material is shown in Table I.

Table I

X-Ray Brightness and Afterglow of Various LaOBr:Bi, Yb

| Mol Bi | Mol Yb | X-Ray Brightness (Arbitrary Units) | Afterglow (in millivolts after reported time, in seconds) | | | | | |
|---|---|---|---|---|---|---|---|---|
| | | | 0 | 1 | 10 | 30 | 60 | 120 |
| .05 | 0 | 27 | 70 | 60 | 30 | 15 | 10 | 5 |
| .05 | .002 | 15 | 10 | 1 | ½ | 0 | 0 | 0 |
| .10 | 0 | 20 | 80 | 70 | 18 | 8 | 5 | 2 |

As can be noted from the above table, the addition of ytterbium results in a marked afterglow decrease. The further reported arbitrary brightness values in said table demonstrate some brightness loss for ytterbium addition in providing substantial elimination of the afterglow.

Other emission characteristics of the present phosphors are reported in Table II on the next page to illustrate another benefit which is derived. Specifically, the percent emission of the present phosphor materials is compared with conventional CaWO$_4$ in the spectral region where "crossover" is encountered with blue sensitive photographic film. The crossover problem occurs with a double emulsion photographic film since both emulsions can be exposed by the same screen image. This problem is reduced if the particular phosphor material being employed emits less visible radiation at wave lengths greater than 400 nm. As can be noted from Table II below, the CaWO$_4$ phosphor emission is only 25% at wavelengths below 400 nm. while 75% emission lies in the 400–460 nm. region where most crossover occurs. The reported emission characteristics of the present phosphor materials demonstrate a preponderance of emission below 400 nm. for a substantial reduction of this problem.

Table II

Comparison of Relative % Emission below 400 nm. Compared to Emission between 400 and 460 nm. for LaOBr:Bi

| Phosphor | % Emission Below 400 nm. | % emission 400–460 nm. |
|---|---|---|
| CaWO$_4$ | 25% | 75% |
| LaOBr .001 Bi | 68 | 32 |
| LaOBr .005 Bi | 65 | 35 |
| LaOBr .05 Bi | 51 | 49 |

It will be apparent from the foregoing descripiton that a new phosphor material has been disclosed for X-ray image converters having improved performance compared with conventional CaWO$_4$ phosphor. It should also be appreciated from the foregoing description that the present phosphor material can be prepared differently than above herein disclosed and to further include slight compositional modifications for added improvement in a particular product application. For example, it is contemplated that mixtures of lanthanum and gadolinium ion in the present phosphor material can produce equivalent performance in radiographic screen products. It is intended to limit the present invention, therefore, only by the scope of the following claims.

What I claim as new and desire to secure by Letters Patent of the United States is:

1. An X-ray image converter comprising well-formed crystals of a phosphor material having the general formula of LnOBr:Bi$^{3+}$ wherein Ln is one or more of La and Gd, with Bi being present as an activator at a concentration level in the approximate range 0.0005 – 0.15 mole per mole of phosphor.

2. An X-ray image converter as in claim 1 wherein the phosphor material has chloride ion partially substituted for bromide ion.

3. An X-ray image converter as in claim 1 wherein the phosphor material further contains ytterbium ion at a concentration level from a small but effective amount sufficient to reduce afterglow up to approximately 0.01 mole per mole of phosphor.

4. An X-ray image converter as in claim 1 comprising a radiographic screen having the phosphor material supported on a base member.

5. A radiographic screen as in claim 4 adapted for intensifying the exposure of a photographic film to X-rays.

6. An X-ray image converter as in claim 4 wherein said phosphor is bismuth-activated lanthanum oxybromide.

7. A rare earth oxyhalide phosphor of reduced afterglow having the general formula:

Ln$_{1-x-y}$OBr:Bi$_x$Yb$_y$ wherein
Ln is one or more of La and Gd
$x$ is from 0.0005 to 0.15 mole per mole of LaOBr, and
$Y$ from a small but effective amount to reduce afterglow up to approximately 0.01 mole per mole of LaOBr.

* * * * *